United States Patent
Flitsch et al.

(10) Patent No.: US 12,360,708 B2
(45) Date of Patent: Jul. 15, 2025

(54) ALLOCATION, DISTRIBUTION, AND CONFIGURATION OF VOLUMES IN STORAGE SYSTEMS

(71) Applicant: NVIDIA CORPORATION, Santa Clara, CA (US)

(72) Inventors: Tobias Flitsch, San Jose, CA (US); Shayan Askarian Namaghi, San Jose, CA (US); Siamak Nazari, Mountain View, CA (US)

(73) Assignee: Nvidia Corporation, Santa Clara, CA (US)

( * ) Notice: Subject to any disclaimer, the term of this patent is extended or adjusted under 35 U.S.C. 154(b) by 166 days.

(21) Appl. No.: 18/267,392

(22) PCT Filed: Dec. 15, 2021

(86) PCT No.: PCT/US2021/063578
§ 371 (c)(1),
(2) Date: Jun. 14, 2023

(87) PCT Pub. No.: WO2022/132947
PCT Pub. Date: Jun. 23, 2022

(65) Prior Publication Data
US 2024/0061621 A1 Feb. 22, 2024

Related U.S. Application Data

(60) Provisional application No. 63/129,446, filed on Dec. 22, 2020, provisional application No. 63/125,856, filed on Dec. 15, 2020.

(51) Int. Cl.
G06F 3/06 (2006.01)
G06F 8/65 (2018.01)
G06F 9/4401 (2018.01)

(52) U.S. Cl.
CPC .......... *G06F 3/0665* (2013.01); *G06F 3/0619* (2013.01); *G06F 3/067* (2013.01); *G06F 8/65* (2013.01); *G06F 9/4401* (2013.01)

(58) Field of Classification Search
CPC ...... G06F 3/06; G06F 3/0604; G06F 11/1448; G06F 3/067; G06F 3/0619;
(Continued)

(56) References Cited

U.S. PATENT DOCUMENTS 9,641,615 B1  5/2017  Robins et al.
11,343,352 B1 * 5/2022  Golden ................... H04L 67/60
(Continued)

OTHER PUBLICATIONS

C. A. Ardagna, E. Damiani, F. Frati, G. Montalbano, D. Rebeccani and M. Ughetti, "A Competitive Scalability Approach for Cloud Architectures," 2014 IEEE 7th International Conference on Cloud Computing, Anchorage, AK, USA, 2014, pp. 610-617.*
(Continued)

*Primary Examiner* — Pierre Michel Bataille
(74) *Attorney, Agent, or Firm* — Hogan Lovells US LLP

(57) ABSTRACT

Configuring, distributing, and managing virtual volumes in a storage system are automated and simplified so that administrators may be relieved of such tasks and non-storage administrators can make use of the storage technology. Considering operating system and application requirements, a cloud-based storage management infrastructure can perform the automated process and may employ templates that define necessary information and processes regarding how service processing units are clustered in a storage platform, volume distribution of virtual volumes, volume properties, and presentation to servers.

21 Claims, 6 Drawing Sheets

(58) Field of Classification Search
CPC .............. G06F 11/3006; G06F 3/0631; G06F 11/2064; G06F 11/3433; G06F 3/0665; G06F 11/3034; G06F 11/2028; G06F 3/065; G06F 2201/815
See application file for complete search history.

(56) References Cited

U.S. PATENT DOCUMENTS

| | | |
|---|---|---|
| 2011/0167236 A1 | 7/2011 | Orikasa et al. |
| 2012/0290706 A1 | 11/2012 | Lin et al. |
| 2015/0074279 A1 | 3/2015 | Maes et al. |
| 2015/0341230 A1* | 11/2015 | Dave .................. H04L 41/5058 705/7.29 |
| 2015/0347047 A1* | 12/2015 | Masputra .............. G06F 3/0685 711/114 |
| 2016/0019636 A1* | 1/2016 | Adapalli ................ H04L 67/10 705/26.81 |
| 2019/0294477 A1* | 9/2019 | Koppes ................ G06F 9/5072 |
| 2019/0332275 A1* | 10/2019 | Jin ..................... G06F 11/2097 |
| 2020/0314174 A1* | 10/2020 | Dailianas ............ G06F 9/45558 |
| 2022/0019385 A1* | 1/2022 | Karr ................... G06F 11/1092 |

OTHER PUBLICATIONS

K. Liu, J. Zhou, L. Qin and N. Lv, "A Novel Computing-Enhanced Cloud Storage Model Supporting Combined Service Aware," 2010 Fifth Annual ChinaGrid Conference, Guangzhou, China, 2010, pp. 275-280.*

I. Foster, B. Blaiszik, K. Chard and R. Chard, "Software Defined Cyberinfrastructure," 2017 IEEE 37th International Conference on Distributed Computing Systems (ICDCS), Atlanta, GA, USA, 2017, pp. 1808-1814.*

I. Klampanos et al., "DARE: A Reflective Platform Designed to Enable Agile Data-Driven Research on the Cloud," 2019 15th International Conference on eScience (eScience), San Diego, CA, USA, 2019, pp. 578-585.*

Fowley, Frank et al., "A Comparison Framework and Review of Service Brokerage Solutions for Cloud Architectures" ICSOC 2013 Workshops, LNCS 8377, pp. 137-149 (2014) Springer International Publishing Switzerland.

Giannitrapani, Antonio et al., "Optimal Allocation of Energy Storage Systems for Voltage Control in LV Distribution Networks" IEEE Transactions on Smart Grid, vol. 8, No. 6, pp. 2859-2870, Nov. 2017.

* cited by examiner

| OS-DEPENDENT STORAGE TEMPLATE 410 | | |
|---|---|---|
| BOOT LUN CAPACITY 412 | URL FOR OS 414 | DATA PROTECTION POLICIES 416 |

| APPLICATON-DEPENDENT STORAGE TEMPLATE 420 | | | |
|---|---|---|---|
| NUMBER OF VOLUMES 422 | | | |
| VOLUME SIZE 424 | DATA PROTECTION POLICIES 426 | SERVER PRESENTATION 428 | |
| ⋮ | ⋮ | ⋮ | ⋮ |
| VOLUME SIZE 424 | DATA PROTECTION POLICIES 426 | SERVER PRESENTATION 428 | |

ALLOCATION, DISTRIBUTION, AND CONFIGURATION OF VOLUMES IN STORAGE SYSTEMS

CROSS-REFERENCE TO RELATED APPLICATIONS

This application is a 371 National Phase of PCT International Application No. PCT/US2021/063578, filed on Dec. 15, 2021, which claims priority to U.S. Provisional Application No. 63/125,856 filed on Dec. 15, 2020, and U.S. Provisional Application No. 63/129,446, filed on Dec. 22, 2020, the disclosures of which are incorporated by reference herein in their entireties for all intents and purposes.

BACKGROUND

Current enterprise storage systems generally need a storage administrator to set up and manage the storage system and particularly to create and manage volumes that the system provides to storage clients. Virtual volumes may be presented to servers with different configurations based on the operating system and applications that consume the storage space. For efficient management, the storage administrator generally needs to be an expert in storage architecture, application architecture, and operating system requirements. Management of a complex storage system often requires the storage administrator to experiment and implement a run book of storage management steps that must be taken for each operating system and application. Conventional management processes are often lengthy and time-consuming and do not guarantee optimal storage configurations with the best performance and reliability for operating systems and applications.

BRIEF DESCRIPTION OF THE DRAWINGS

The drawing illustrates examples for the purpose of explanation and are not of the invention itself. Use of the same reference symbols in different figures indicates similar or identical items.

DETAILED DESCRIPTION

Figure 1A:
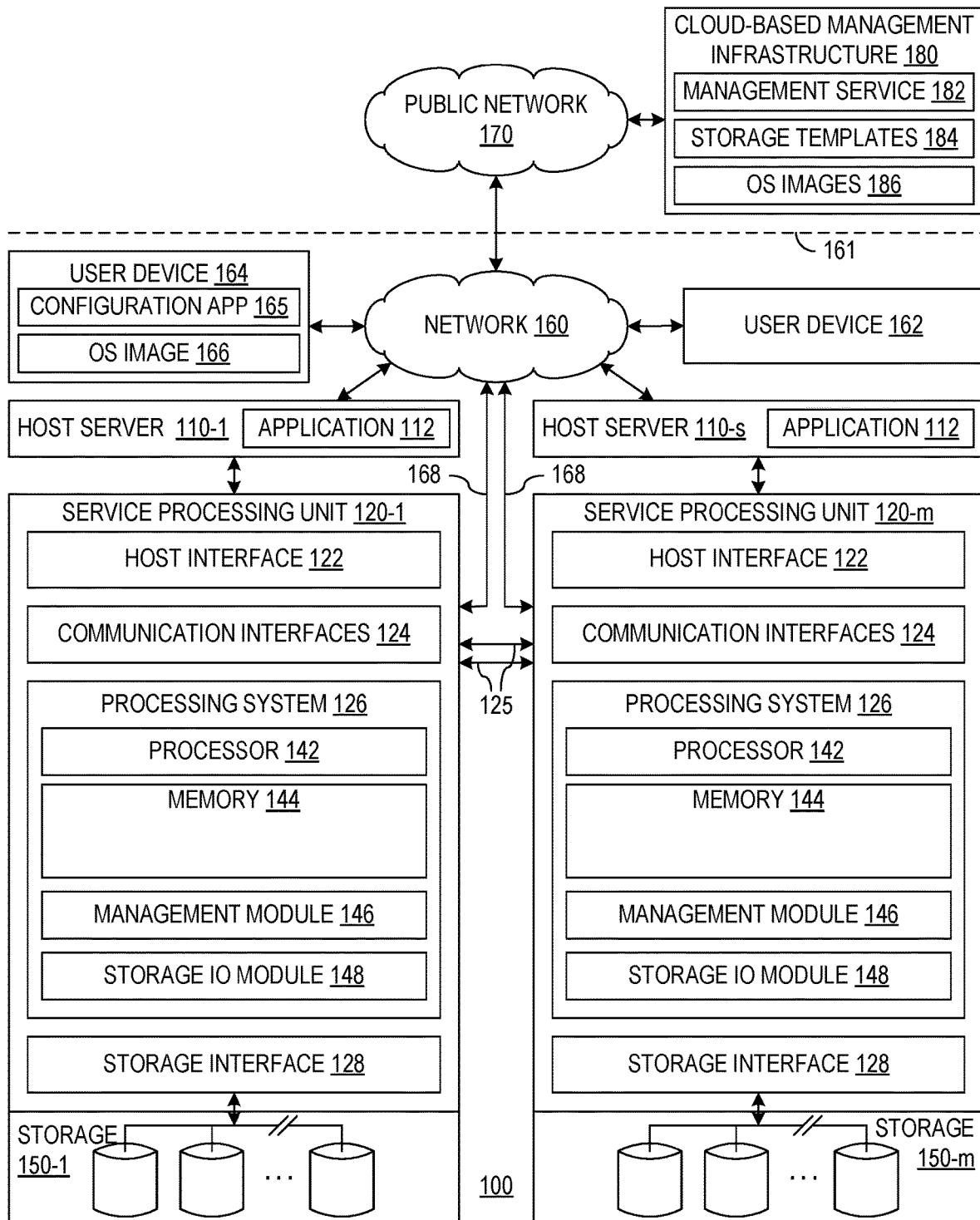
FIG. 1A is a block diagram illustrating an overall storage architecture including a storage platform and cloud-based management before storage allocation, distribution, and configuration processes in accordance with one example of the present disclosure.

In accordance with an aspect of the current disclosure, the tasks of setting up and managing virtual volumes in a storage platform are automated and simplified so that human administrators may be relieved of the complexity of such tasks, and users can use storage technology without having storage system expertise. The automated process can eliminate guesswork through use of expert-developed and user-tested templates provided through a cloud-based service, and storage consumers can receive the correct configurations for their storage systems without the need for storage expertise or experimentation.

One example of the present disclosure automates every step in the process of creating, distributing, presenting, monitoring, and optimizing the storage volumes. An enterprise may only need to acquire hardware and select a target template that corresponds to the goals or a desired state for an enterprise storage system, and the automated process based on the target template all necessary processes, e.g., allocation, distribution, and configuration of volumes, to place the enterprise storage system in a state that achieves the selected goals. This can eliminate the need of having a dedicated storage administrator and avoids the guesswork and experimentation that prior storage solutions required to achieve the best performance and reliability for any specific application.

In accordance with another aspect of the present disclosure, storage provisioning workflows are simplified, and application owners, application developers, and operations teams can implement in their data centers on-premises. By solving complex parts of on-premises information technology infrastructure, smart-infrastructure storage may provide a utility that may become a standard for application servers in data centers.

In accordance with yet another aspect of the invention, cluster storage with cloud-based management provides the ability to create and provision one or more boot volumes for one or more servers when provisioning the cluster storage. The boot volume(s) may be defined in a storage template and created and populated, without any further actions from the user, as part of a setup or a restart of the cluster storage.

Configuration and management of a storage platform as described herein may be through the cloud. When provisioning storage, the user may create a storage template or select an existing storage template for the storage, and the user can add a boot volume and set the size of boot volume in the template. The user also can assign or select a URL of an OS image for the operating system that the user wants installed on a boot drive. The OS image may be hosted on an internal web server that is on the same, e.g., private, network as the server or may be hosted in the cloud. When the user then creates the cluster storage, the boot volume is automatically created along with other storage volumes, and the boot image is automatically pulled from the web server and written to the boot volume. Once the image is written, the boot volume is automatically presented to the server as a boot device. If the boot volume is the only boot device present, then the server will typically just boot from the boot volume. A service processing unit given valid credentials may configure a server so that the boot volume is the default boot device. Otherwise, the only additional step for the user would be to select the desired boot device as the default boot device in the basic input output system (BIOS) of the server.

Figure 1B:
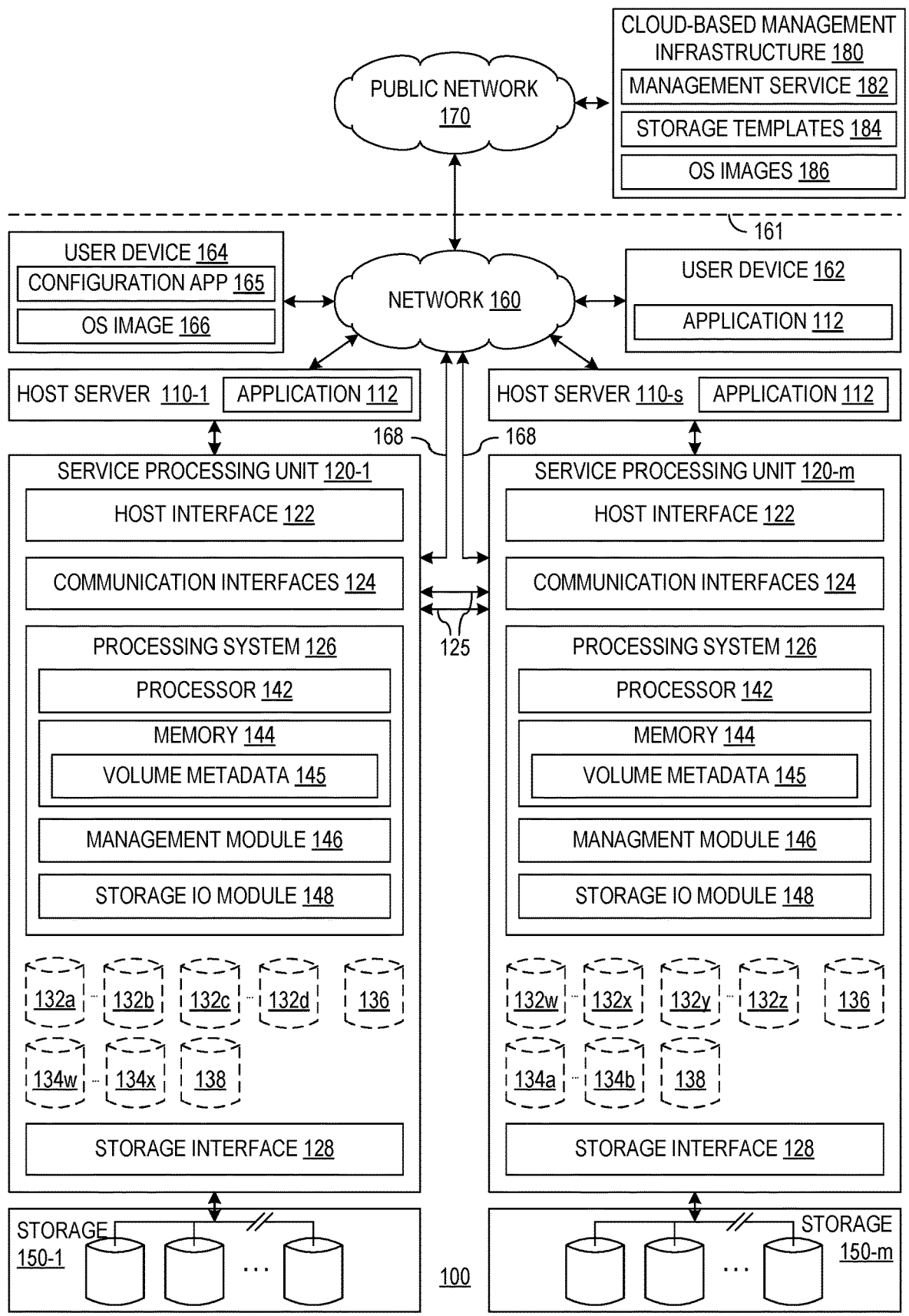
FIG. 1B is a block diagram illustrating the architecture of FIG. 1A after automated storage allocation, distribution, and configuration processes in accordance with one example of the present disclosure.

FIGS. 1A and 1B are block diagrams showing a storage architecture including a storage platform 100 in accordance with one example of the present disclosure. FIG. 1A specifically shows storage platform 100 before allocation, distribution, and configuration of virtual volumes, and FIG. 1B shows the same storage platform 100 after allocation, distribution, and configuration of virtual volumes.

Storage platform 100 includes one or more host servers 110-1 to 110-s, which are sometimes generically referred to herein as host server(s) 110. Each host server 110 may be a conventional computer or other computing system including a central processing unit (CPU), memory, and interfaces for connections to internal or external devices. One or more service processing units (SPUs) 120-1 to 120-m, which are sometimes generically referred to herein as SPU(s) 120, are installed in host servers 110. In general, storage platform 100 may include one or more host servers 110, with each server 110 hosting one or more SPUs 120. A minimum configuration may include a single host server 110 in which one or more SPUs 120 resides. To improve redundancy, storage platform 100 may be a cluster storage system including at least two host servers 110 and at least at least two SPUs 120, but more generally, a limitless number of different configurations are possible containing any number s of host servers 110 and any number m of SPUs 120. In general, storage platform 100 is scalable by adding more SPUs 120 with associated backend storage.

Each SPU 120 generally includes a host interface 122, communication interfaces 124, a processing system 126, and a storage interface 128.

Host interface 122 provides communications between the SPU 120 and its host server 110. For example, each SPU 120 may be installed and fully resident in the chassis of an associated host server 110. Each SPU 120 may, for example, be implemented with a card, e.g., a PCI-e card, or printed circuit board with a connector or contacts that plug into a slot in a standard peripheral interface, e.g., a PCI bus in host server 110, and host interface 122 provides circuitry providing compliance with the protocols of the host server bus.

Communication interfaces 124 in an SPU 120 provide communications with other SPUs 120 and to other network connected devices. Multiple SPUs 120, e.g., SPUs 120-1 to 120-m in FIGS. 1A and 1B, may be interconnected using high speed data links 125, e.g., one or more parallel 10, 25, 50, 100 or more Gbps Ethernet links, to form a dedicated data network for a pod or cluster of SPUs 120 in storage system 100. Data links 125 may particularly form a high-speed data network that directly interconnects the SPUs 120 in the pod or cluster, and the data network may be independent of a private network 160 of the enterprise. Communication interfaces 124 may also allow each SPU 120 to communicate through private network 160 with user devices 162 and 164 on network 160 and through private network 160, a firewall 161, and a public network 170, e.g., the Internet, with a cloud-based management infrastructure 180.

Processing system 126 in an SPU 120 includes one or more microprocessors or CPUs 142 and memory 144 that the SPU 120 employs to provide storage services. Processing system 126 may particularly implement a storage IO module 148 that processes storage operations such as read and write requests from storage clients. In accordance with an aspect of the present disclosure, processing system 126 further implements a management module 146 that can communicate with cloud-based management infrastructure 180 and with other SPUs 120 during a setup process that creates and configures virtual volumes that the SPU 120 owns or maintains. Management module 146 may also operate during subsequent automated storage management or maintenance processes. All or a portion of management module 146 may be part of a driver for SPU 120 that SPU 120 runs when powering up.

Each SPU 120 controls backend storage, e.g., backend storage 150-1 to 150-m, sometimes generically referred to herein as backend or persistent storage 150. Storage interface 128 in each SPU 120 includes circuitry and connectors for the attached backend storage 150. Backend storage 150 may employ, for example, hard disk drives, solid state drives, or other nonvolatile/persistent storage devices or media in which data may be physically stored, and storage 150 particularly may have a redundant array of independent disks (RAID) 5 or 6 configuration for performance and redundancy.

Each SPU 120 may employ communication interfaces 124 and connections 168 to connect to a network, e.g., to local or private network 160 and through network 160 and firewall 161 to public or wide area network 170, e.g., the Internet. In some implementations of storage platform 100, storage clients, e.g., applications 112 running on a server 110, may request storage service through an SPU 120 resident in the host 110. In an example implementation, an application 112 may send a storage service request, e.g., a read or write request targeting a storage volume, to a server 110, and the server 110 communicates the storage service request to an SPU 120 resident in the server 110. The storage IO module 148 in the resident SPU 120 may provide the storage service or may forward the storage service request through data network 125 to another SPU 120, e.g., to the SPU that owns a volume targeted by the storage service request. Storage clients in general execute at least one application 112 that require storage services that storage platform 100 provides. FIGS. 1A and 1B further show that private network 160 may provide a connection through firewall 161 to public network 170, so that devices 162 and 164, servers 110, and SPUs 120 may remotely communicate, for example, with cloud-based management infrastructure 180.

Cloud-based management infrastructure 180 may include a computer or server that is remotely located from storage platform 100, and management infrastructure 180 provides a management service 182 to reduce the burden of storage management on an enterprise or offload the burden of storage setup and management to an automated process as disclosed herein. Cloud-based management service 182 may be used to manage SPUs 120, e.g., to configure SPUs 120 in a pod or cluster in storage platform 100, monitor performance of storage platform 100, or provide analysis services. Management service 182, during a setup process, may particularly determine an allocation of storage volumes to meet the needs of an enterprise, distributed the allocated volumes to SPUs 120-1 to 120-m, and create a recipe for SPUs 120 to execute to bring storage platform 100 to the desired working configuration such as shown in FIG. 1B.

FIG. 1B illustrates storage system 100 after the setup process. As mentioned above, each SPU 120, after being set up, may provide storage services to host servers 110 and applications 112 via virtual volumes or logical unit numbers (LUNs). FIG. 1B particularly shows SPU 120-1 provides storage services relating to a set of base virtual volumes 132a to 132b and 132c to 132d and SPU 120-m provides storage services relating to base volumes 132w to 132x and 132y to 132z. SPU 120-1 is sometimes referred to as "owning" base volumes 132a to 132b and 132c to 132d in that SPU 120-1 is normally responsible for fulfilling IO requests that are directed at any of volumes 132a to 132b and 132c to 132d. Similarly, SPU 120-m owns base virtual volumes 132-w to 132-x and 132y to 132z in that SPU 120-m is normally responsible for executing IO requests that are directed at any of base volumes 132-w to 132-x and 132y to 132z. The virtual volumes, e.g., volumes 132a to 132b, 132c to 132d, 132w to 132x, and 132y to 132z, in FIG. 1B are sometimes generically referred to herein as virtual or base volume(s) 132.

Each base volume 132 may be a "mirrored" volume or an "unmirrored" volume with each mirrored volume having at least one backup volume 134 kept somewhere in storage platform 100. In FIG. 1B, SPU 120-1 maintains backup volumes 134w to 134x that copy mirrored base volumes 132y to 132z that SPU 120-m owns, and SPU 120-m maintains backup volumes 134a to 134b that copy mirrored base volumes 132a to 132b that SPU 130-1 owns. One or more backup volumes 134a to 134b and 134w to 134x of FIG. 1B are sometimes generically referred to herein as backup volume(s) 134. As described further below, backup volumes 134 may be virtual volumes that are copies of respective base volumes 132, and a mirrored base volume 132 may have one or more backup volumes 134. A backup volume 134 may become a base volume when the SPU 120 that owns the backed-up base volume 132 becomes unavailable. Volumes 132c to 132d and 132y to 132z are "unmirrored," meaning volumes 132c to 132d and 132y to 132z do not have associated backup volumes.

SPUs 120 may also maintain snapshots 136 of one or more base volumes 132 or backup volumes 134 and may further provide unshared volumes 138 that are normally not available for data storage outside of the host server 110. Each snapshot 136 corresponds to the data of a volume 132 or 134 at a time corresponding to the snapshot 136, and a snapshot volume 136 may be used recover a prior state of the snapshotted volume 132 or 134. Unshared volumes 138 may include volumes that are only used by the host server 110, e.g., boot LUNs storing an operating system for the host server 110. In general, an unshared volume 138 may be a mirrored or an unmirrored volume.

The state of storage platform 100 illustrated in FIG. 1A may be the state that storage platform has when it is initially assembled or installed at an enterprise. For example, an enterprises having storage needs my purchase servers 110-1 to 110-s, SPUs 120-1 to 120-m, and backend storage 150-1 to 150-m and install storage nodes, each node including a server 110 with one or more associated SPUs 120 and backend storage 150. The storage nodes may be installed at one or more locations throughout the enterprise, interconnected using dedicated storage network links 125, and connected to the network 160 serving the enterprise. The storage platform 100 (FIG. 1A) thus assembled still needs to be configured to provide the storage needs of the enterprise. A setup process may transform storage platform 100 from the state illustrated in FIG. 1A to the state illustrated in FIG. 1B where storage clients can receive storage services using base virtual volumes 132.

Figure 2:
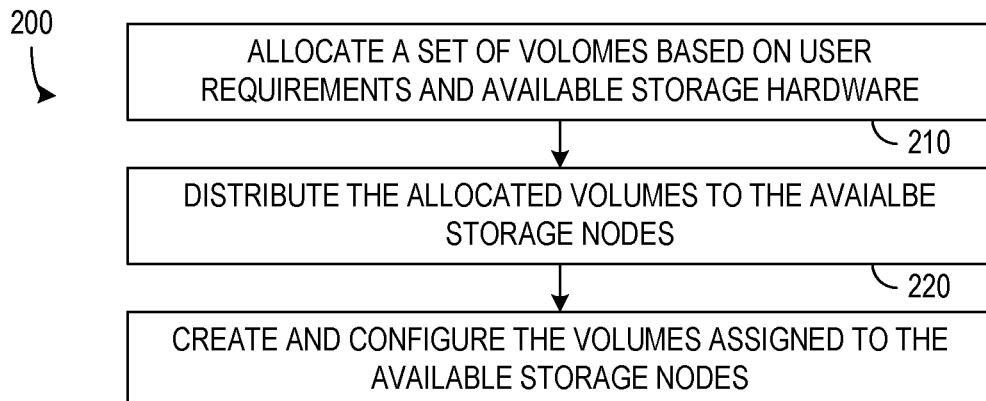
FIG. 2 is a flow diagram of a storage system setup process in accordance with an example of the present invention.

Prior enterprise storage systems have needed a human storage administrator to create, configure, and subsequently manage virtual volumes of a storage system. FIG. 2 is a flow diagram of an automated setup process 200 that can create and configure a cluster storage system. Process 200 is described here with reference to a specific example in which process 200 uses cloud-based management service 182 and transforms storage platform 100 from the state shown in FIG. 1A into the state shown in FIG. 1B. Process 200 may begin with a process 210 in which a set of volumes that meet the storage requirements of the enterprise are allocated. The allocation of volumes may be based a target template selected according to the applications, e.g., applications 112, that use the enterprise storage and according on the capabilities of the available hardware, e.g., the storage capacity of backend storage devices 150 and the configuration of servers 110 and service processing units 120. Allocation process 210 can produce a list of allocated volumes, e.g., boot LUNs 138 for host servers 110 and base volumes 132 that may need backup volumes and may have policies defining a schedule for capturing snapshots.

Once allocation process 210 identifies the volumes that the enterprise needs, a distribution process 220 determines where the needed volumes will reside in the hardware. For the example of storage system 100 of FIG. 1A, distribution process 220 identifies which (if any) of the SPUs 120 will own boot volumes 138 for their host servers 110 and distributes the base volume 132 and backup volumes 134 to the SPUs 120. In accordance with an example of the present disclosure, a successful distribution process may result in a generation of a recipe to be executed by the storage nodes (e.g., SPUs 120) to get the cluster storage into the desired state.

A process 230 creates and configures the volumes in the storage nodes, e.g., the SPUs 120 use execute the recipe that distribution process 220 identified for assigning and configuring the allocated volumes in the storage nodes. In the example of storage platform 100, cloud management service 182 may transmit the recipe to storage platform 100, e.g., to a selected SPU 120, and the SPUs 120 execute their portions of the recipe to create base volumes 132 that the SPUs 120 will own and create the backup volumes 134 that the SPU 120 will maintain. An SPU 120 creating a volume 132, 134, or 138 may include the SPU 120 initializing of metadata 135, e.g., information to identify where blocks of the volume 132 or 134 are stored in physical backend storage 150 of the SPU 120. Configuration may further include using information from the storage template or templates for volumes 132 or 134 to define snapshot schedules for the volumes. Any allocated boot volumes 138 may be created and configured using an OS image 166 or 186 selected according to a template or other information defining the boot volume.

A volume allocation process, such as process 210 of FIG. 2, may define allocated volumes with different configurations, and an efficient or optimal allocation and configuration of volumes may depend on many factors such as the operating system of the host servers and which applications will consume the storage services for the volumes. In accordance with an example of the present disclosure, automated allocation process 210 may use storage templates that correspond to different applications and operating system and that indicate the characteristics of the volumes that can efficiently provide storage services for the applications and operating systems. Using one or more appropriate storage templates, an allocation process such as allocation process 210 of FIG. 2 can generate a list of volumes that need to be distributed and created in the storage system and can identify the characteristics and configuration of the allocated volumes.

Cloud-based management service 182 of FIGS. 1A and 1B may store, provide, and use such storage templates 184 during an automated setup of storage platform 100, so that an enterprise using storage platform 100 does not need an expert manager to determine the ideal allocation of volumes in storage platform 100. Experts knowledgeable about storage architectures and the relevant applications may develop and share storage templates 184, and storage templates 184 may be refined through experimentation evaluation of system performance in many storage systems.

A storage template may define all the necessary information and processes for setting up service processing units in a storage clustered. For example, an enterprise may select shared nothing architecture, where every base volume is only accessible by or through the sever 110 containing the SPU that owns the volume. A storage template specific to the shared-nothing architecture may contain information and processes that indicate an optimal volume placement in a shared-nothing storage architecture, optimal volume properties, and optimal presentation to servers and may considering operating system and application requirements. A non-storage expert can simply select one or more storage templates that correspond to desired functionality to have their enterprise storage set up according to centrally defined policies and achieve optimal storage configuration for their operating system and applications.

Figure 3:
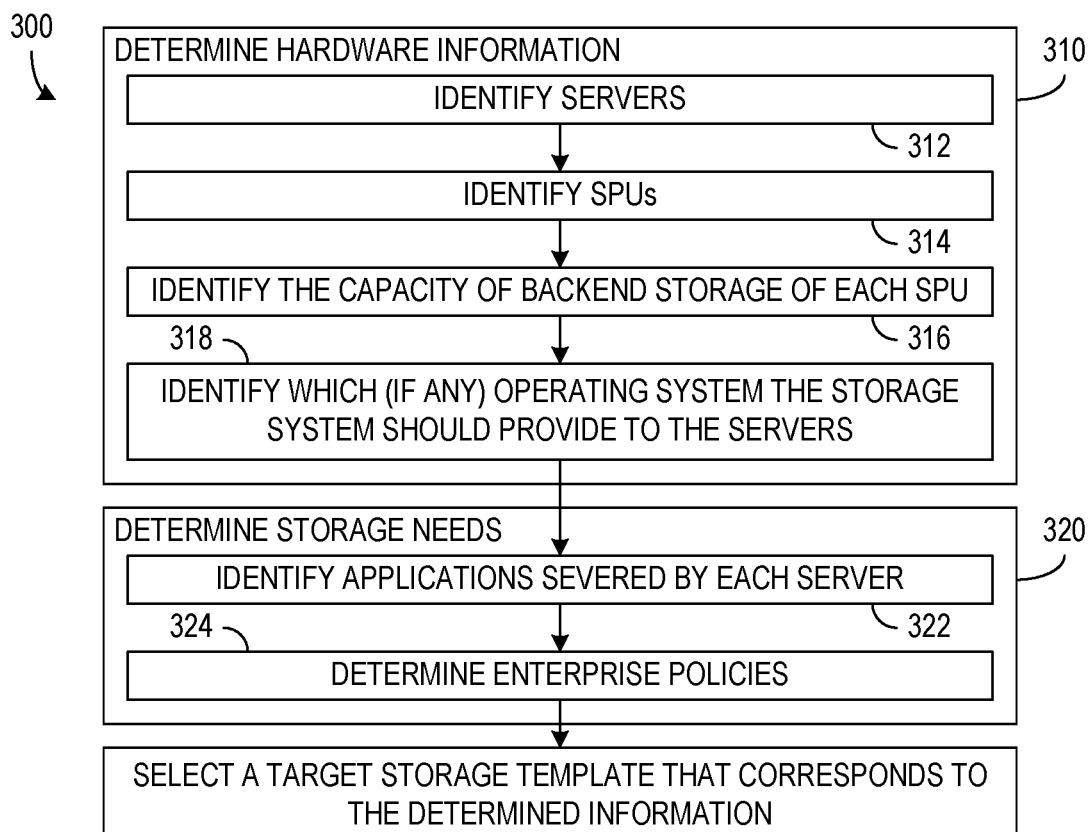
FIG. 3 is a flow diagram of a process for selecting a template for allocation of volumes in a cluster storage system in accordance with an example of the present disclosure.

FIG. 3 shows a flow diagram of a process 300 for selecting a template or templates for setup of a cluster storage system. Process 300 includes determining hardware information as illustrated in process block 310, determining enterprise storage needs as illustrated in process block 320, and selecting one or more storage templates based on the determined information as illustrated in process block 330. For example, for storage platform 100 of FIG. 1A, an expert or non-expert administrator with a user device 164 may employ an application 165, e.g., an Internet browser, to contact cloud-based management service 182, and cloud-based management service 182 may provide a user interface through which the administrator may provide basic hardware information such as identifying the servers 110-1 to **110-*s* or SPUs 120-1 to 120-*m* for the storage cluster as in subprocesses 312 and 314, identifying the storage capacities of backend storage 150-1 to 150-*m* as in a subprocess 316, and identifying which (if any) operating system the storage platform should provide for servers 110-1 to 110-*s* as in subprocess 318. Cloud-based management service 182 may also be able to contact SPUs 120 (or contact one specific SPU 120) using communication links 168** to determine or confirm some or all the hardware information, instead of requiring a human administrator to enter all the information.

The storage needs of the enterprise may be similarly determined through an administrator interacting with the cloud-based management service as illustrated in process block 320. The administrator in a step 322 may indicate what applications will be consuming storage services and in a step 324 indicate or select the types of storage policies that the enterprise desires in the storage system. A process 330 may then select (with or without customization) one or more storage templates from the available storage templates, e.g., storage templates 184, to fit the hardware information and storage needs of the enterprises.

Figures 4, 5:
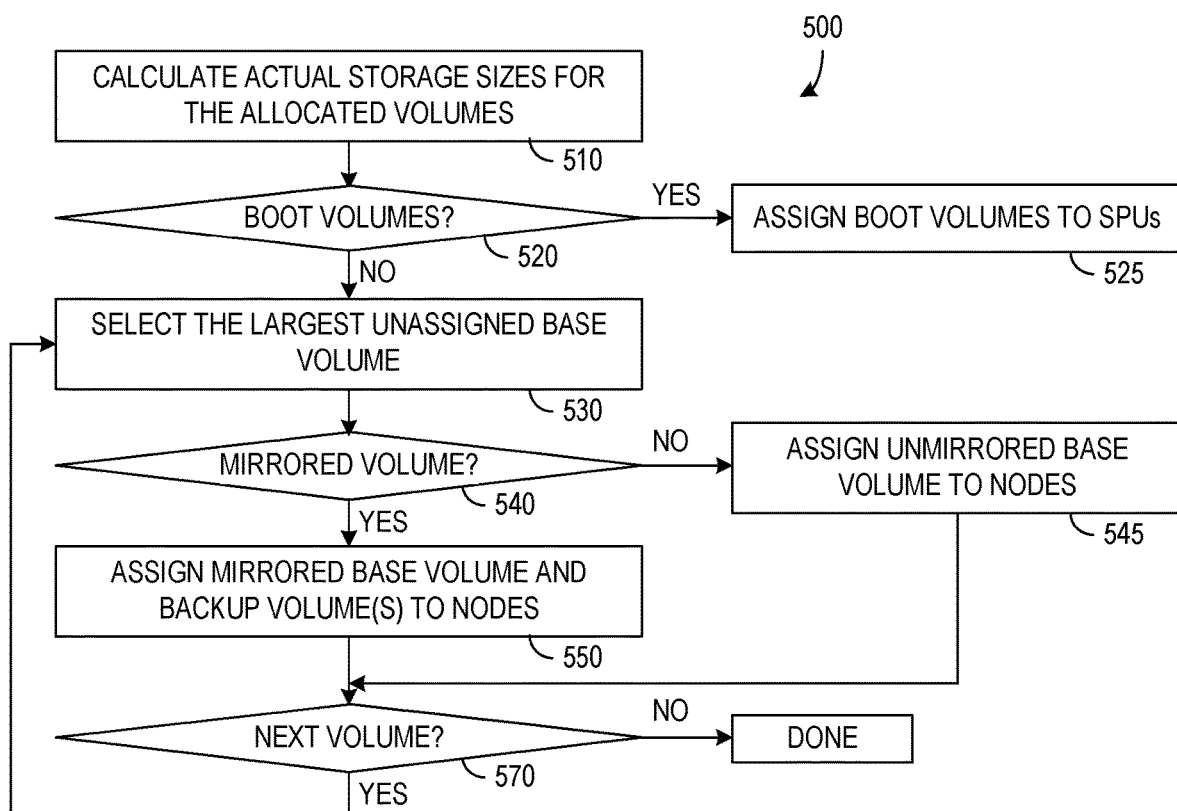
FIG. 4 is a block diagram illustrating example storage templates for use in an automated setup process in accordance with an example of the present disclosures.
FIG. 5 is a flow diagram of a process in accordance with an example of the present disclosure for distributing allocated volumes to service processing units in a cluster storage system in accordance with an example of the present disclosure.

A storage template can define configuration properties covering all aspects of storage volumes in an application cluster, and FIG. 4 illustrates examples of fields or information that may be included in a storage template 410 or 420.

Storage template 410 illustrates an operating system (OS) dependent storage template that defines characteristics of a boot LUN or boot volume. The creation and presentation of unique boot devices (e.g., boot volumes 138) to individual servers in a storage cluster is operating system specific. Different versions of Microsoft Windows® or Linux, for example, may require different volume capacities or sizes, and an OS-dependent template 410 corresponding to a particular operating system may have a field 412 indicating a volume size that is optimized for that operating system. An OS-dependent template 410 may further include a field 414 containing a universal resource locator (URL), e.g., an Internet address, from which an image for the operating system or an updated operating system may be downloaded for automatic provisioning of the operating system in the volume corresponding to a boot LUN, e.g., a boot LUN 138. In the example of FIG. 1A, cloud-based management infrastructure 180 may present multiple operating system images 186 with each OS image 186 corresponding to a different operating system version and being accessible at different URLs, and each boot volume 138 shown in FIG. 1B may contain an operating system installed from the OS image 186 identified in URL from field 414 in the selected storage template. Alternatively, a user device, e.g., web server, 164 connected to private network 160 may provide an OS image 166 that is specifically for one or more servers 110 in storage platform 100. OS-dependent template 410 may further include a field 416 indicating operating system-specific data protection policies, including but not limited to policies for snapshots and mirroring of boot volume or storage volumes.

An application-dependent template 420, which may also be operating system dependent, may be used for the creation and presentation of application-optimized data volumes to servers 110 providing storage services for an application, e.g., application 112 in FIG. 1A or 1B. Application-dependent template 420 may indicate a number 422 of types of volumes that an application corresponding to the template may need. For example, a database application might need a log volume that stores a write-ahead log and one or more data volumes that store database data. Each volume for an application may have different properties that will yield the best performance and storage reliability for a particular application on a storage system. The example of application-dependent template 420 indicates volume sizes 424 that are tailored to respective volumes for an application with the given server's hardware configuration.

Volume size 424 may be adjusted depending on factors including but not limited to: capabilities persistent storage devices 150; CPU and memory in servers 110 or devices 162 running applications 112; application-specific data protection settings 426, including but not limited to protection against drive failure, server failure, SPU failures, and other failures; and application-specific presentation 428 of volumes to the appropriate servers 110 in a cluster. The volume size 424 may indicate an amount of data that the volume must be able to accommodate, but the physical storage required for a volume may further depend on several factors such as a savings factor, storage mirroring, and data protection policies. Data protection policies 426 may indicate whether or how often snapshots of the volume should be captured to protect volume data. Server presentation parameters 428 may indicate, for example, whether volumes are shared (i.e., accessible by or through all servers 110) or unshared (i.e., only accessible by or through one server 110).

Volume sizes provided in templates may (or may not) indicate the size of data without use of compression or other storage capacity saving techniques, and volume sizes may be adjusted to better represent the actual data storage needed in physical storage. A savings factor for application data, for example, accounts for data reduction data services, including but not limited to compression and/or deduplication, that a storage platform provides. The savings factor may be represented as a ratio (X:1), and the savings factor for an application may be equal to the total amount of application data that the application needs stored divided by the total physical storage space required to store the application data after the storage system performs compression, deduplication, or other storage capacity saving techniques. A savings factor may be estimated for a particular application, and that estimated saving factor may be improved through analysis of actual performance of storage platforms. Volume sizes in storage templates for a targeted operating system and application(s) may be improved through savings factors determined from continuous monitoring, cataloging, and reporting of storage system performance.

Another factor affecting the physical storage requirements for a volume is storage mirroring. Storage mirroring defines whether a volume has one or more exact replicas in different availability zones, including but not limited to another server, rack, row, room, or datacenter for storage high availability. Storage sharing may also define whether volumes are presented to all servers in an application cluster as shared storage or to individual servers as local storage. With shared storage, any server in an application cluster can perform I/O requests to any volume in the storage cluster.

The allocation processes as described above can choose one or more templates that correspond to a set of volumes that a storage system needs for efficient operation. For the example of FIG. 1A, a user of cloud-management service 182 may identify servers 110 and choose a storage template for the provisioning of a new storage cluster for storage platform 100 of FIG. 1A when the user wants the policies in the selected template to take effect for the SPUs 120 in their storage cluster. The volumes identified by the templates still need to be distributed to and created by the SPUs 120 and configured according to the volume properties indicated in the template or templates. Consequently, the configured storage cluster such as storage platform 100 as shown in FIG. 1B will be compliant with the settings that are defined in the selected templates and feature, including but not limited to, pre-provisioned storage artifacts, snapshot schedules, and boot volumes with an operating system.

FIG. 5 shows a process 500 for distributing and creating volumes that are defined by the template or templates selected for a cluster storage system. In the system of FIG. 1A, cloud-based management service 182 may perform process 500 by applying the selected storage template(s) to the available configuration of SPUs 120 to create a recipe defining where the allocated volumes 132, 134, and 138 will reside in the cluster storage system. Process 500 starts in subprocess 510 by calculating the actual data volume sizes that the allocated volumes need in the backend storage of the cluster storage. The actual data volume size of a volume may be determined by dividing the volume size that is defined in an applicable storage template by an applicable saving factor. As an example, if the template indicates the volume size is 1 TiB and the saving factor is 2:1, the selected volume only needs 500 GiB on the backend storage 150.

A decision process 520 determines whether the one or more selected templates include boot volumes for the servers in the cluster storage. If the one or more selected templates specify boot volumes for the servers in the cluster, a process 525 assigns one boot volume for each server. For each server, if the server has a single SPU, the boot volume for the server may be assigned to the SPU resident in the server, if the backend storage of the SPU has sufficient available capacity for the desired operating system, e.g., if the available storage capacity in the backend storage is greater than or equal to the actual data volume size required for the operating system. In the case where a single server contains more than one SPU, process 525 may assign the boot volume for the server on the SPU with the most available storage capacity. In cases where none of the SPUs resident in a host server have sufficient available storage capacity (a pass-through SPU), process 525 may choose an SPU in another server that meets the available storage capacity requirement.

A process 530 may select a base volume from among the allocated volumes, e.g., starting with largest volumes and working toward smaller volumes. The requirements for a base storage volume depend on whether the base volume is mirrored. A decision process 540 determines whether the selected volume is mirrored. Depending on the mirrored/unmirrored mode that the storage template specifies for the selected volume, process 540 chooses between two different approaches for assigning volumes. For an unmirrored volume, a process 545 selects an SPU and assigns the selected base volume to the selected SPU. For a mirrored volume, a process 550 assigns the selected base volume and one or more backup volume for the selected base volume to different SPUs. Assigning a volume in process 545 or 550 in the example of FIGS. 1A and 1B generally includes cloud-based management service 182 adding the volume-node assignment to a recipe for creating and configuring volumes. Once the selected volume has been assigned, a decision process 570 determines whether all allocated volumes have been assigned so that process 500 is done. If not, process 500 may branch from decision process 470 back to volume selection process 550 and continue assigning the remaining allocated volumes.

Mirrored volume assignment process 550 is complicated by the needs of backup volumes. The storage template may define a number n of backup volumes for the base volume. In general, a base volume has one natural owner SPU, and the backup volumes should be in other SPUs, preferably in other servers, for high redundancy and high availability. Given that storage systems may be positioned for mission-critical workloads and enterprise applications, how process 550 chooses to distribute backup volumes may be a critical choice for storage users. The goals for process 550 when distributing backup volumes to SPUs in a cluster include: 1. minimizing wasted capacity by maximizing the number of volumes with a defined size, while ensuring a pseudo-random relationship between different SPUs in a cluster; 2. optimally balancing I/O workloads during normal operation and in failure scenarios by evenly balancing volume ownership across SPUs in a storage cluster; 3. allowing use of weights and biases for volume placement across nodes using metadata from the cloud, including but not limited to physical locations or server hardware configurations, which can be modified on-demand purely in the cloud; 4. avoiding tight coupling between two SPUs in terms of volume ownership and backup relationship and ensuring fan out failover for volume ownership to avoid too much load on a single SPU in the case when an SPU becomes unavailable.

Figure 6:
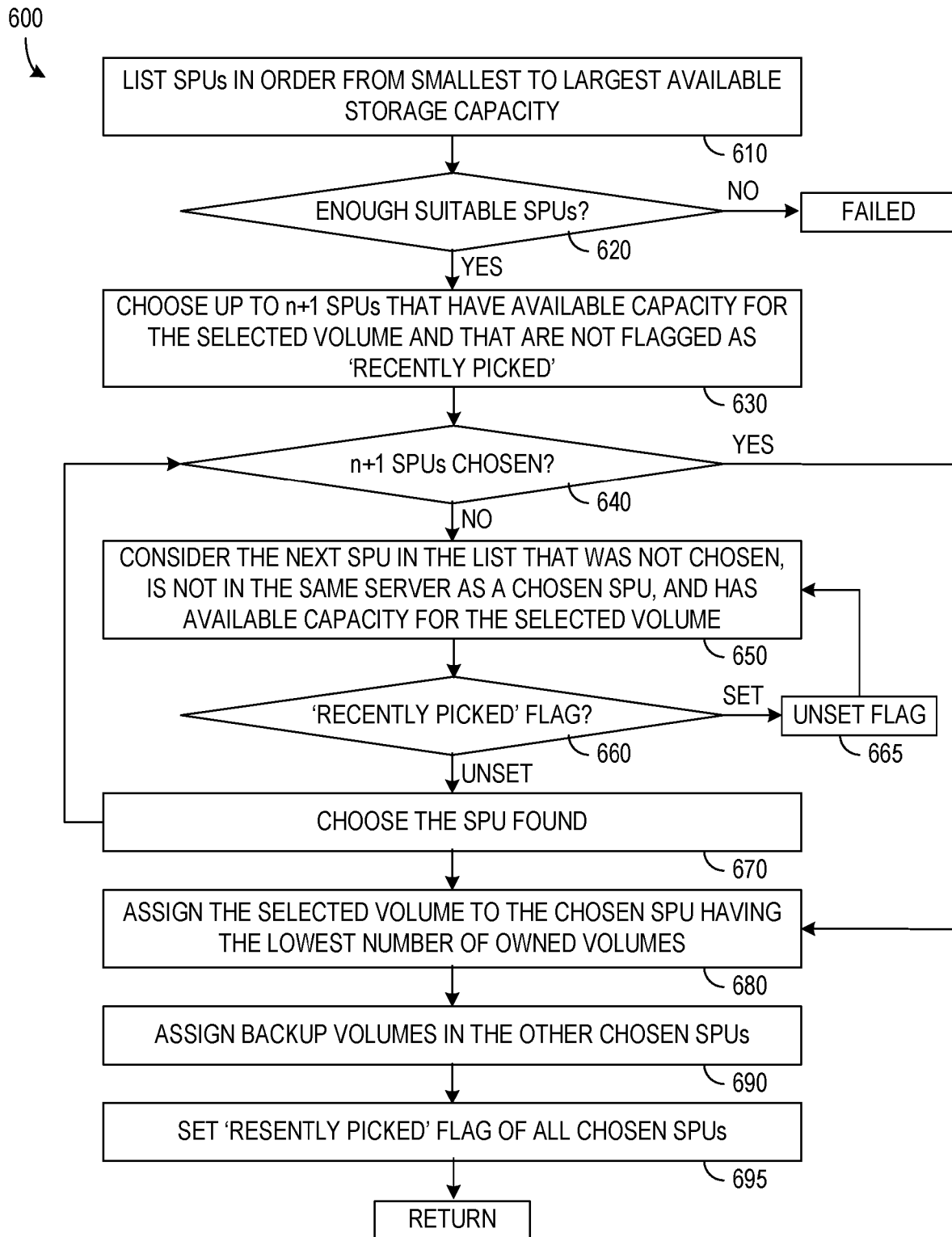
FIG. 6 is a flow diagram of a process in accordance with an example of the present disclosure for allocating or distributing in a storage system a mirrored base volume and backup volumes for the mirrored base volume.

A distribution and assignment process 600 as shown in FIG. 6 may determine the owner and backup SPUs for a mirrored volume requiring n backups (n+1 total copies) in a storage cluster with m SPUs.

In each iteration of process 600, a subprocess 610 sorts the SPUs in the storage cluster from lowest to highest available storage capacity. A decision process 620 can then determine if the storage cluster includes sufficient, e.g., n+1, suitable SPUs for storage of the base and backups of the mirrored volume. Process 600 terminates if decision process cannot determine an owner SPU and a set of n backup SPUs that meet the criteria of each having available storage capacity is at least as large as the actual data volume size of the mirrored volume. In the event of a failure, the cloud-based management service may alter the template or selected another template or may recommend that the enterprise alter their target storage goals or increase hardware storage capacity. As an example, if process 600 needs to find two SPUs that have at least the actual data volume size of the mirrored volume and the SPUs are sorted based on available storage capacity from process 610, decision process 620 can check whether the SPU at the second position from the end of the ordered SPU list has sufficient available storage capacity and is in a different server than the SPU in the first position to determine whether process 600 fails or succeeds. In general, assuming all of the SPUs are in different servers, decision process 620 can inspect the n+1th element from the end of the list to determine whether to proceed.

A subprocess 630 then scans through the list of SPUs sorted based on their current available storage capacity, from highest to lowest index (most available capacity to least) in order. For each candidate SPU, if the candidate SPU doesn't have a "recently-picked" flag set, and if the candidate SPU is not in the same server as one of the previously chosen candidates, process 630 chooses that SPU. Process 640 continues evaluating SPUs in order until either n+1 SPUs have been chosen or until the list of SPUs has been exhausted.

A decision process 640 determines whether process 630 terminated after choosing n+1 SPUs or if process 630 reached the lowest index (0) without choosing n+1 SPUs. If n+1 SPU have been chosen, process 600 may branch from decision process 640 to a process of distributing the base and backup volumes to the chosen SPU. If process 630 terminate before choosing n+1 SPUs, a process 650 starts over from the highest index again and considers SPUs that haven't been chosen before. Process 650 skips SPUs that are in the same server with any other chosen SPU. If consideration in process 650 determines an SPU has sufficient available storage capacity, a decision process 660 determines whether the "recently picked" flag is set. If the "recently-picked" flag of the SPU was set to true, process 650 doesn't choose that SPU. Instead, a process 665 clears the "recently-picked" flag to false, so that a next iteration of process 650 through the SPU list would be able to choose that SPU. If process 650 finds a suitable SPU having an unset "recently picked" flag, the SPU is chosen, and decision process 640 again determines whether n+1 SPUs have been chosen. Eventual success is guaranteed since decision process 620 previously determined that there are at least enough suitable SPUs.

After choosing the n+1 candidate SPUs for owner and backup(s). A process 680 then may assign the base volume according to an SPU preference from the template or to the SPU with the lowest number of owned volumes, which helps balance the number of owned volumes across the candidates in each iteration. A process 690 assigns the backup volume (s) to the other chosen SPUs, and a process 695 sets the "recently-picked" flags of chosen SPUs to true.

Unmirrored volumes do not require backup volumes in a storage cluster. Therefore, a process such as process 545 of FIG. 5 may try to assign one unmirrored volume or as many unmirrored virtual volumes on each SPU as possible, considering template indicated preference and the actual data volume size of an unmirrored volume after data reduction savings. In cases where the template indicates maximizing the number of volumes of a specific type, the number of provisioned volumes on each SPU may be the SPU available capacity divided by the actual data volume size rounded down to the closest integer.

Figure 7:
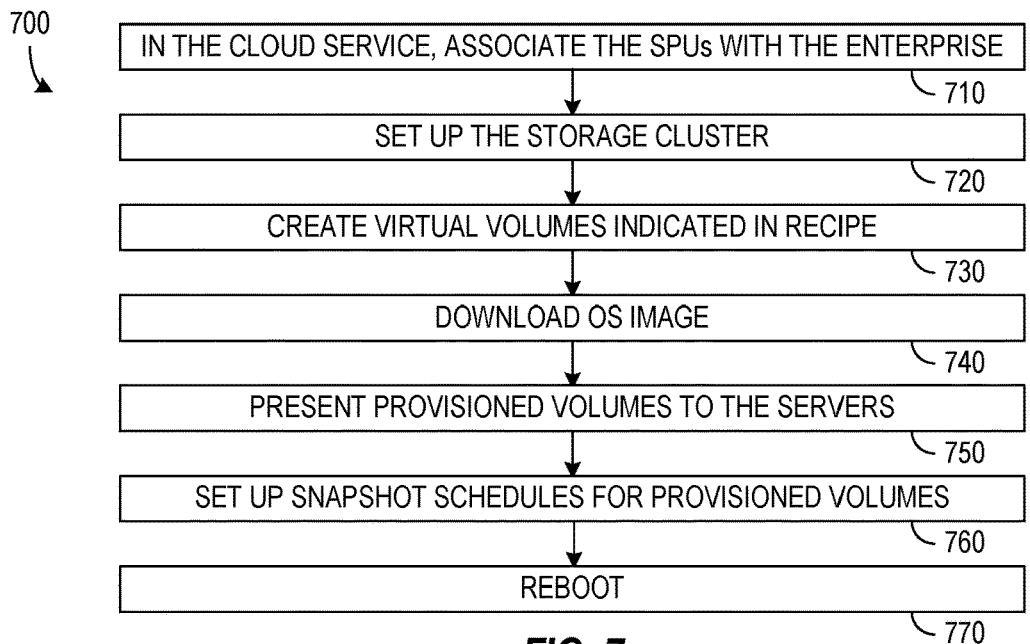
FIG. 7 is a flow diagram of a process in accordance with an example of the present disclosure for creating and configuring the allocated volumes that have been distributed to nodes in a storage system.

If process 500 succeeds in determining a distribution of all allocated volume, the cloud management service may direct the storage nodes to create the volumes and to execute on the policies defined in the storage template(s). FIG. 7 shows a flow diagram of a process 700 for executing on the policies, which is described here with reference to storage platform 100 of FIGS. 1A and 1B. In a process 710, cloud management service 182 associates the identified SPUs with an account of the enterprise if the SPUs 120 in the enterprise storage system have not already been associated. For example, the SPUs 120 of the enterprise storage system 100 are identified, and the cloud-based management service 180 may selects one of the SPUs 120, e.g., SPU-1, for communications.

Cloud-based management service 182 in a process 720 sets up the storage cluster hardware and ensures all SPUs 120 can communicate properly with each other on the data network connection 125. For example, cloud-based management service 182 can contact the selected SPU 120-1 and instructs the SPU 120-1 to confirm communications with the other SPUs.

Cloud management service 182 in a process 730 directs SPUs 120 to create virtual volumes based on the selected storage template and the distribution recipe resulting from the distribution process detailed above. For example, cloud-based management service 182 may use the processes described above to generate a recipe for creation and configuration of volumes and may communicate the recipe to the selected SPU 120. The selected SPU 120 may then communicate portions of the recipe to the other SPUs 120 to complete their parts of the recipe.

A process 740 represents the SPUs 120 configuring their volumes. For boot volumes, configuration includes downloading the OS image 166 or 186 at the URL identified in the recipe to the created boot volume.

Cloud management system in a process 750 directs the SPUs 120 to present the provisioned volumes to servers 110 in accordance with the storage template policies. In particular, created volumes may be presented as unshared volumes or share volumes. For each shared volume, the SPUs 120 that share the volume may need information identifying the SPUs 120 that own or provide backup for the volume.

SPUs 120 in a process 750 configure snapshot schedules for the provisioned volumes and may configure the storage data services in accordance with the storage template policies, including but not limited to data compression, data deduplication, and encryption. To complete the setup, SPUs 120 in a process 760 may direct one or more servers 110 to reboot. For example, an enterprise may provide SPUs 120 with credentials that allow each SPU 120 to set the default boot device for its host sever 110 and to initiate a server reboot using lights out management (LOM) or out-of-band capabilities.

Figure 8:
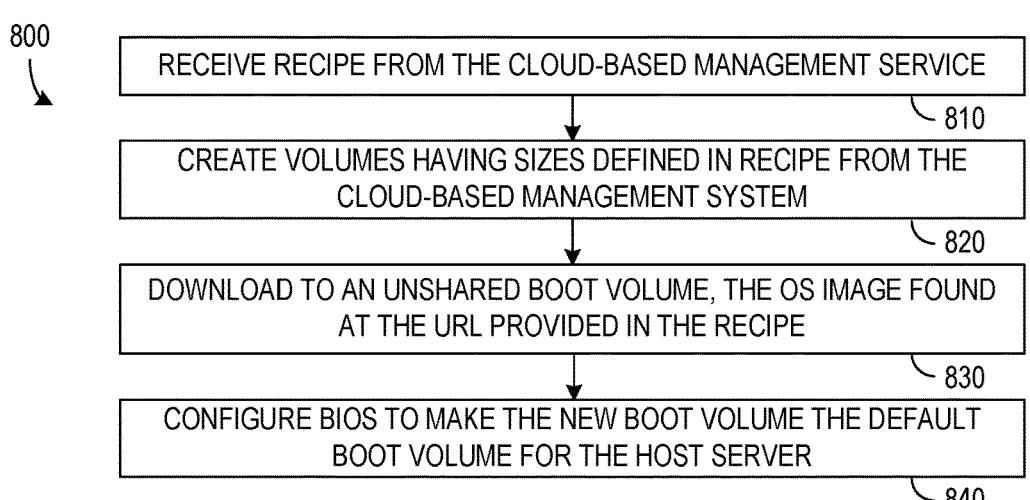
FIG. 8 is a flow diagram of a process in accordance with an example of the present disclosure for creating a boot volume and populating the boot volume from an image at an URL that a storage template identifies for a target operating system.

Servers can boot from volumes automatically created and provisioned in a cluster storage system in accordance with an example of the present disclosure. FIG. 8 is a flow diagram of a process 800 for a storage node in cluster storage to automatically create and provision a boot volume (and other storage volumes) defined by a storage template as described above. Process 800 is described here with reference to the example of an SPU 120 of FIGS. 1A and 1B creating and provisioning volumes including a boot volume 138 for its host server 110. At the time of process 800, the host server 110 and its resident SPU 120 may be powered up. The host sever 110 may be running its BIOS with no access to an operating system for the host server 110 or may have booted an operating system from a source other than new boot volume being create. SPU 120 through its processing system 126 provides an independent computing domain from the host server 110 and may be fully functional while the host server 110 is running the BIOS before the host server 110 begins running its operating system.

Process 800 starts with the SPU 120 receiving a recipe from cloud-based management service or another SPU 120. SPU 120 may receive its recipe from cloud-based management service 182 through network connections 168 to networks 160 and 170 and management infrastructure 180 or from another SPU 120 through data network connections 125. Cloud-based management service 182 can use storage templates and volume distribution processes as described above to generate the recipe having separable parts respectively for all SPUs 120-1 to 120-m in cluster storage 100, and the SPU 120 performing process 800 executes the part of the recipe generated specifically for the SPU 120. Based on the receipt, the SPU 120 performs a volume creation process 810 that creates volumes that were assigned to the SPU 120, including an unshared, boot volume 138 having a volume size in accordance with the recipe. SPU 120 again using its network connection 168 downloads the OS image 166 or 186 identified by the URL provided in the recipe received. Once the operating system is ready in unshared/boot volume 138, the SPU 120 may configure the BIOS of the host server 110 to make the new boot volume 138 the default boot volume for the host server 110.

Figure 9:
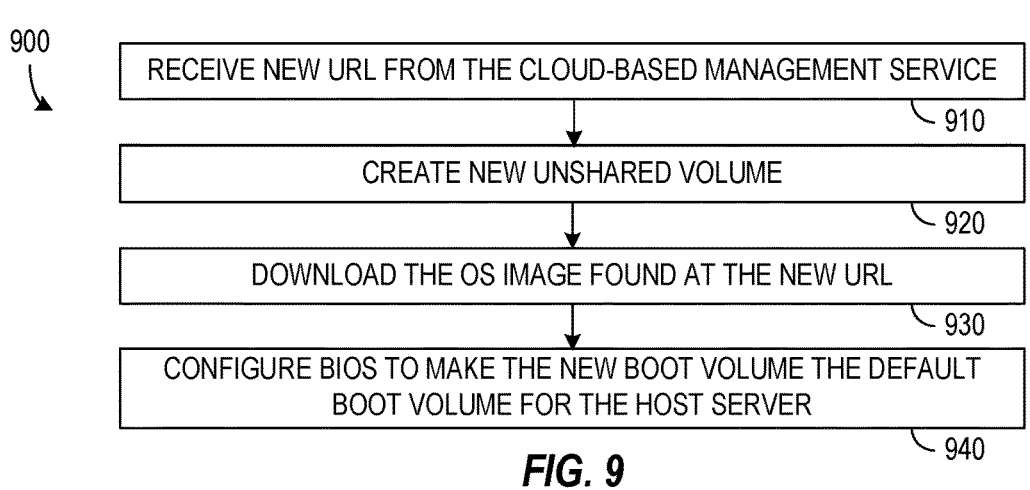
FIG. 9 is a flow diagram of a process in accordance with an example of the present disclosure for updating an operating system from an image at an URL.

A cloud-based management service can manage setup of cluster storage and can also manage operations or updates of cloud storage. For example, when servers in a cluster storage system need an operating system update, the cloud-based service can create a new OS image for the cluster storage. FIG. 9 illustrates an automated OS update process 900 in accordance with an example of the present disclosure. Process 900 is described here with reference to the example of an SPU 120 of FIGS. 1A and 1B updating a boot volume 138 for its host server 110. Process 900 starts with the SPU 120 receiving a new URL from cloud-based management service 182. Cloud-based management service 182, for example, after determining an operating system update is needed, may contact SPU 120 through the network connection 168 of the SPU 120 and transit the new URL to the SPU 120. The SPU 120 performing process 900 upon receiving the URL can determine a size of the updated OS-image 166 or 186 at the URL and, in a process 920, creates a new unshared volume of the needed size. The SPU 120 again using its network connection 168 downloads the new OS image 166 or 186 identified by the new URL. Once the updated operating system is ready in unshared/boot volume 138, the SPU 120 configures the BIOS of the host server 110 to make the new boot volume 138 the default boot volume for the host server 110 and may direct the server to reboot.

Storage templates play a key role during storage cluster provisioning and the properties of new storage clusters as described above. However, policies defined in storage templates that are used for provisioning new storage clusters may not be enforced and may not restrict users from dynamically making changes to their infrastructure, specifically the configuration of their storage platforms. Some policies may not be changed if configured in the storage template as enforced, others may be overwritten in individual storage clusters. Therefore, the storage cluster's configuration may deviate from the original storage template over time. At the time a storage cluster is created, a version of the storage template and its policies may be stored in the storage cluster. This allows cloud-based management to monitor and analyze storage system parameters including but not limited to the saving factor, performance levels, and application reliability of a storage cluster, and the cloud-based management can compare the performance of the altered policies with the performance of the policies set in its original storage template. Given that one storage cluster is built for one operating system and application combination, the results from any deviations can be used to tune and optimize storage templates precisely and to optimize the active storage cluster configuration with more tailored settings for a particular workload.

The management service, based on refinements to templates, may recommend modifications to existing storage platforms. For example, provisioning of additional capacity on a running storage cluster with additional volumes may be recommended when the observed saving factor in the storage platform is better than the anticipated saving factor in the storage template. The management service may also recommend: changes to storage template policies using empirical settings of multiple customers for a particular application; use of current operating system versions of existing storage cluster members for boot images during storage cluster expansion instead of aging operating system images in the template and allow building an operating system catalog from running storage clusters; use of current data saving factor for provisioning new volumes during storage cluster expansion instead of anticipated saving factor in storage templates; and modification of data services for data reduction automatically if observed data saving factor promotes turning compression, deduplication, or other optimizations on or off.

Some policies in the storage template may be enforced and allow easy configuration changes on all storage clusters that were built from the template. For example, modification of the snapshot schedules in the template may be inherited by all storage clusters that make use of the same template. This may also be used for applying governance rules for dynamically provisioned volumes. For example, if policies in the storage template do not provision any volumes as they are created using application integrations (Kubernetes CST-Driver, VMware VVols), the storage template policies can still enforce snapshot schedules for dynamically provisioned volumes in accordance with company policies. The central modifications are bound to role-based access control and can only be performed within a user's security boundary.

Each of the modules disclosed herein may include, for example, hardware devices including electronic circuitry for implementing the functionality described herein. In addition, or as an alternative, each module may be partly or fully implemented by a processor executing instructions encoded on a machine-readable storage medium.

All or portions of some of the above-described systems and methods can be implemented in a computer-readable media, e.g., a non-transient media, such as an optical or magnetic disk, a memory card, or other solid state storage containing instructions that a computing device can execute to perform specific processes that are described herein. Such media may further be or be contained in a server or other device connected to a network such as the Internet that provides for the downloading of data and executable instructions.

Although implementations have been disclosed herein, these implementations are only examples and should not be taken as limitations. Various adaptations and combinations of features of the implementations disclosed are within the scope of the following claims.

What is claimed is:

1. A system comprising:
   a storage platform including:
   a plurality of servers;
   a plurality of service processing units in the servers; and
   a plurality of storage devices connected to and controlled by the service processing units; and
   a management infrastructure providing a management service that automates an allocation of virtual volumes according to a target template indicating a desired state of the storage platform, distribution of the virtual volumes to the service processing units, and generation of a recipe of instructions for the service processing units to create and provision the virtual volumes in the storage platform to implement the desired state in the storage platform.

2. The system of claim 1, wherein the management infrastructure is cloud-based.

3. The system of claim 2, wherein the service processing units have a network connection, and the management service communicates the recipe through one or more of the network connections to at least one of the service processing units.

4. The system of claim 1, wherein the management service provides a plurality of templates with different ones of the templates being tailored to different characteristics of additional storage platforms, the different characteristics including different operating systems and different applications that will be storage clients of the additional storage platforms, where the target template is selected from among the plurality of templates.

5. The system of claim 1, wherein the target template represents one or more volume types to be provided in the desired state of the storage platform, and for each of the one or more volume types, the target template indicates a size for the volume type, data protection policies for the volume type, and server presentation information for the volume type.

6. The system of claim 1, wherein the target template represents a boot volume to be provided in the desired state of the storage platform, the target template further representing a volume size for the boot volume, a universal resource locator for an operating system image to be used in the boot volume, and data protection policies for the boot volume.

7. The system of claim 1, wherein the management service is configured to execute a recipe generation process comprising:
   allocating to the service processing units base volumes identified in the target template;
   allocating to the service processing units one or more backup volumes for the base volumes that the target template indicates are mirrored volumes; and
   adding to the recipe of instructions for each of the service processing units to create any of the base volumes and the backup volumes that the management service allocated to the service processing units.

8. The system of claim 1, wherein the management service is configured to execute a recipe generation process including allocating to the service processing units one boot volume for each of the servers, wherein for each server,
   the boot volume for the server is allocated to the service processing units in the server if the storage device connected to the service processing units has an available capacity equal or larger than a volume size the target template indicates for the boot volume, and
   the boot volume for the server is allocated to the service processing unit in another of the servers if the available capacity of the storage device connected to the service processing units in the server is less than the volume size the target template indicates for the boot volume.

9. The system of claim 1, wherein at least one of the service processing units has a network connection, and the management service transmits the recipe of instructions directly to the at least one of the service processing units through the network connection.

10. The system of claim 9, wherein the service processing units are interconnected using a data network, and the at least one service processing unit transmits one or more portions of the recipe of instructions through the data network respectively to the service processing units.

11. The system of claim 10, wherein the service processing units collectively execute the recipe of instructions by:
    creating in the storage system the virtual volumes indicated in the recipe;
    setting up snapshot schedules for the virtual volumes;
    configuring presentation of the virtual volumes to the servers; and
    downloading an operating system image in the virtual volumes that the recipe of instructions identifies as boot volumes.

12. A process comprising:
    selecting a target template corresponding to a desired state of a storage system that includes one or more storage nodes, each storage node including a server, one or more service processing units in the server, and a storage device connected to and controlled by the service processing units;
    operating a cloud-based service to generate a recipe based on the target template;
    the cloud-based service providing the recipe to at least one of the one or more service processing units, one or more portions of the recipe being respectively directed to the at least one of the one or more service processing units; and
    each of the one or more service processing units executing its portion of the recipe, wherein the one or more service processing units collectively executing the recipe creates and configures volumes in the storage system to place the storage system in the desired state.

13. The process of claim 12, wherein an administrator of the storage system interacts with the cloud-based service to select the target template, and wherein constructing the recipe, providing the recipe to at least one of the one or more service processing units, and the service processing units collectively executing the recipe occurs automatically without the administrator taking further action.

14. The process of claim 12, further comprising the cloud-based service providing a plurality of templates with different ones of the templates being tailored to different characteristics of storage platforms, the different characteristics including different operating systems and different applications that will be storage clients of the storage platforms, where the target template is selected from among the plurality of templates.

15. The process of claim 12, wherein the target template represents one or more volume types to be provided in the desired state of the storage system, and for each of the volume types, the target template indicates a size for the volume type, data protection policies for the volume type, and server presentation information for the volume type.

16. The process of claim 12, wherein the target template represents a boot volume to be provided in the desired state of the storage system, the target template further representing a volume size for the boot volume, a universal resource locator for an operating system image to be used in the boot volume, and data protection policies for the boot volume.

17. The process of claim 12, wherein the cloud-based service generating the recipe comprises:
 allocating to the one or more service processing units base volumes identified in the target template;
 allocating to the one or more service processing units one or more backup volumes for the base volumes that the target template indicates are mirrored volumes; and
 adding to the recipe for each of the service processing units to create any of the base volumes and the backup volumes that the cloud-based service allocated to the one or more service processing units.

18. The process of claim 12, wherein the cloud-based service generating the recipe comprises allocating to the one or more service processing units one boot volume for each of one or more servers, wherein for each of the one or more servers,
 the boot volume for the server is allocated to a service processing unit in the server if the storage device connected to the service processing unit has an available storage capacity equal to or larger than a volume size the target template indicates for the boot volume, and
 the boot volume for the server is allocated to the service processing unit in another of the servers if the available storage capacity of the storage device connected to the service processing unit in the server is less than the volume size the target template indicates for the boot volume.

19. The process of claim 12, wherein at least one of the service processing units has a first network connection, and the cloud-based service transmits the recipe to the at least one of the service processing units through the first network connection.

20. The process of claim 19, wherein the service processing units are interconnected using a data network, and the at least one service processing unit transmits the portions of the recipe through the data network respectively to the service processing units.

21. The process of claim 12, wherein the service processing units collectively executing the recipe comprises:
 creating in the storage system one or more virtual volumes indicated in the recipe;
 setting up snapshot schedules for the one or more virtual volumes;
 configuring presentation of the one or more virtual volumes to the servers; and
 downloading an operating system image in the one or more virtual volumes that the recipe identifies as boot volumes.

* * * * *